United States Patent

Graham et al.

Patent Number: 6,004,908
Date of Patent: Dec. 21, 1999

[54] RAPID GEL FORMATION IN HYDROCARBON RECOVERY

[75] Inventors: Rhonda L. Graham; Leonard J. Persinski, both of Pittsburgh, Pa.

[73] Assignee: Clearwater, Inc., Pittsburgh, Pa.

[21] Appl. No.: 09/200,939

[22] Filed: Nov. 25, 1998

[51] Int. Cl.⁶ .............. C09K 3/00; E21B 21/00; B01J 3/00
[52] U.S. Cl. .......... 507/238; 507/239; 507/271; 507/922; 516/98; 516/104; 516/24
[58] Field of Search .............. 507/238, 239, 507/271, 922; 516/98, 104, 24

[56] References Cited

U.S. PATENT DOCUMENTS

| | | | |
|---|---|---|---|
| 3,575,859 | 4/1971 | Monroe | 252/32.5 |
| 3,757,864 | 9/1973 | Crawford et al. | 166/308 |
| 4,003,393 | 1/1977 | Jaggard et al. | 137/15 |
| 4,120,356 | 10/1978 | Meister | 166/267 |
| 4,153,649 | 5/1979 | Griffin | 260/950 |
| 4,541,483 | 9/1985 | Walton | 166/270.2 |
| 4,780,221 | 10/1988 | Holtmyer et al. | 507/225 |
| 5,271,464 | 12/1993 | McCabe | 166/295 |
| 5,334,325 | 8/1994 | Chaussee | 424/43 |
| 5,417,287 | 5/1995 | Smith et al. | 166/308 |
| 5,514,645 | 5/1996 | McCabe et al. | 507/238 |
| 5,571,315 | 11/1996 | Smith et al. | 106/285 |
| 5,614,010 | 3/1997 | Smith et al. | 106/285 |
| 5,647,900 | 7/1997 | Smith et al. | 106/285 |
| 5,693,837 | 12/1997 | Smith et al. | 556/148 |
| 5,846,915 | 12/1998 | Smith et al. | 507/269 |

FOREIGN PATENT DOCUMENTS 0551021  7/1993  European Pat. Off. .

Primary Examiner—D. Gabrielle Brouillette
Assistant Examiner—LaToya I. Cross
Attorney, Agent, or Firm—William L. Krayer

[57] ABSTRACT

Method and composition for gel formation in hydrocarbon recovery, in which an organic phosphate ester is gelled by a novel activator composition comprising iron sulfate, dibutylaminoethanol, and a phosphate surfactant.

8 Claims, 5 Drawing Sheets

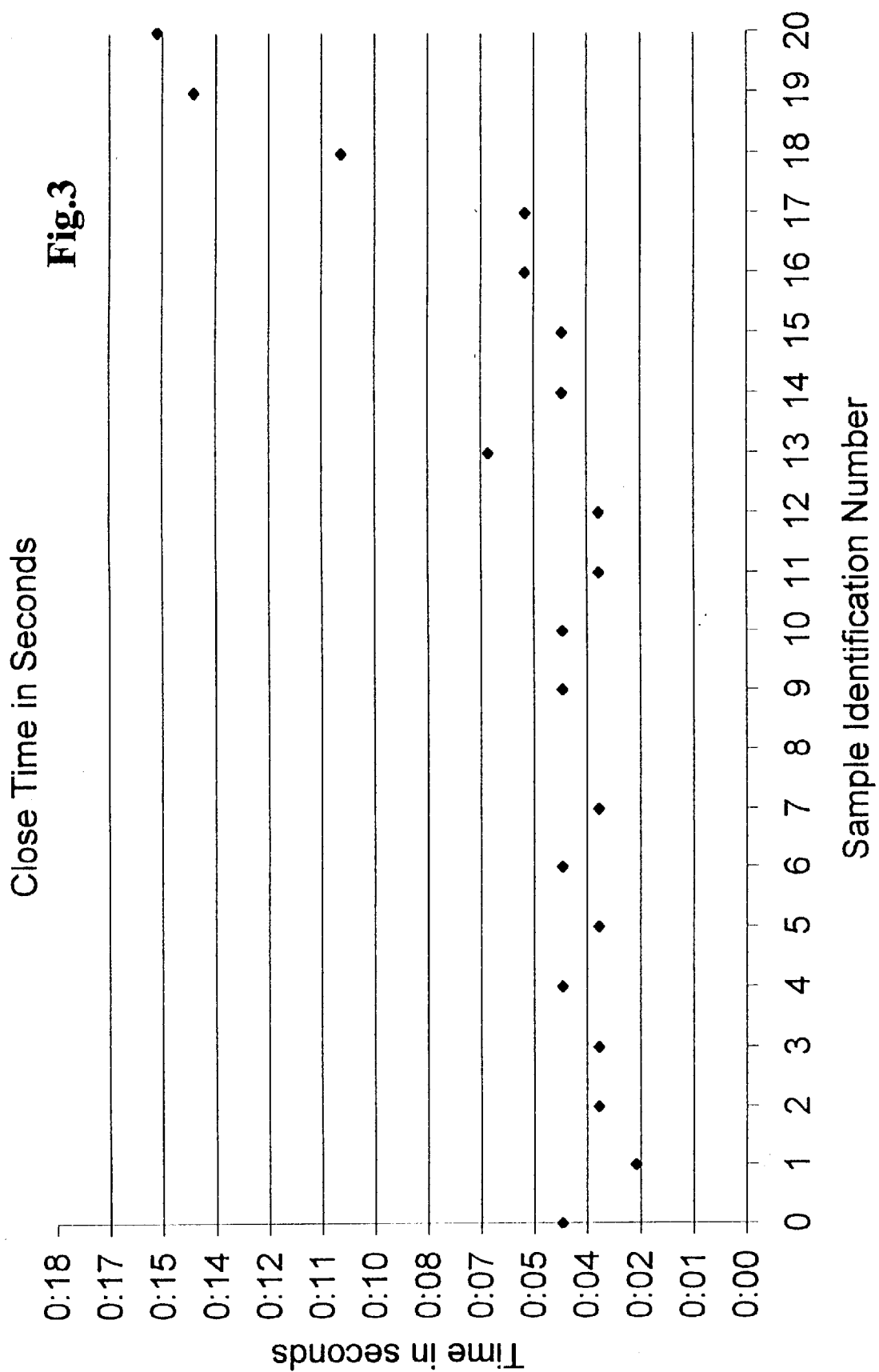

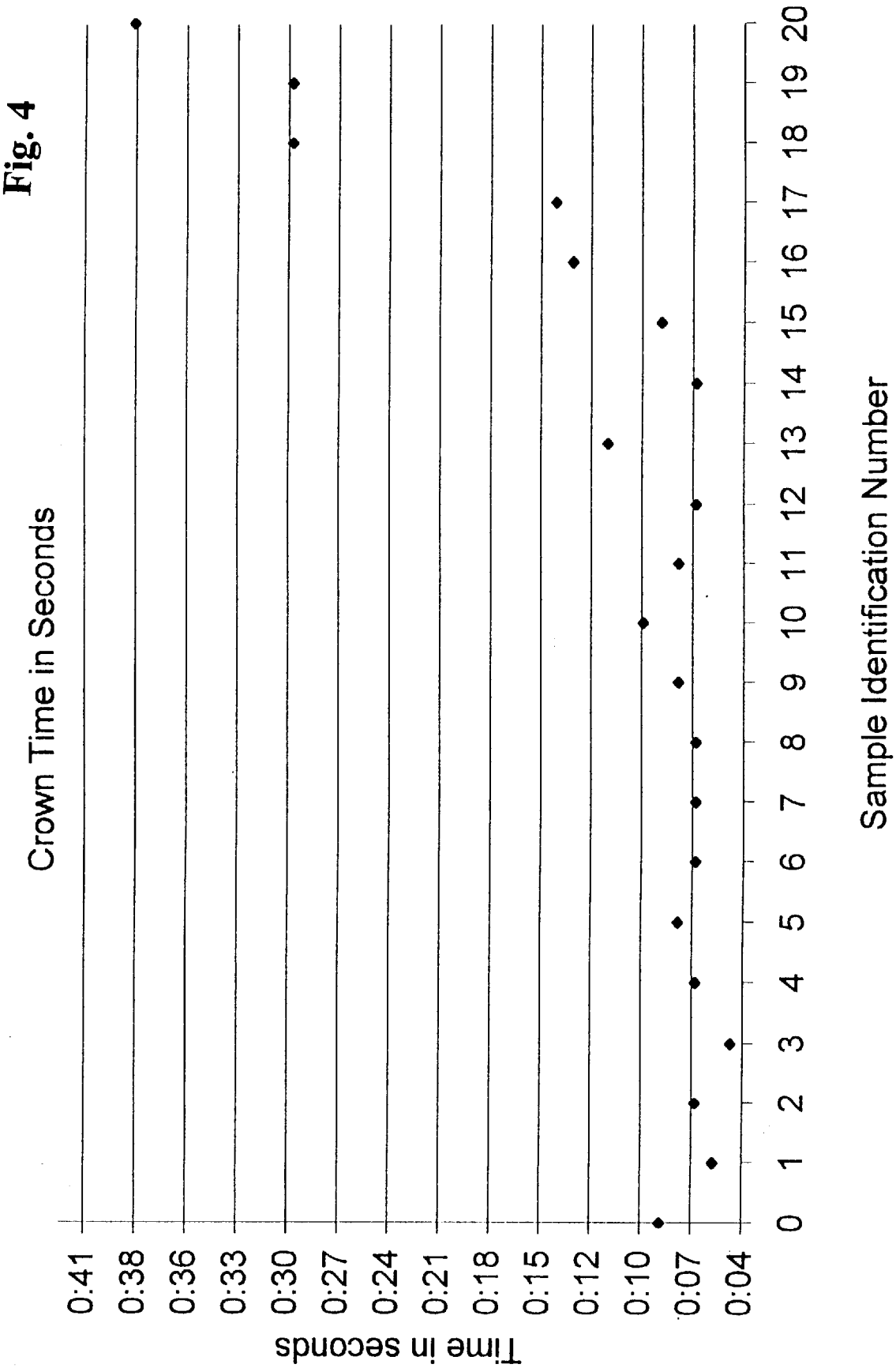

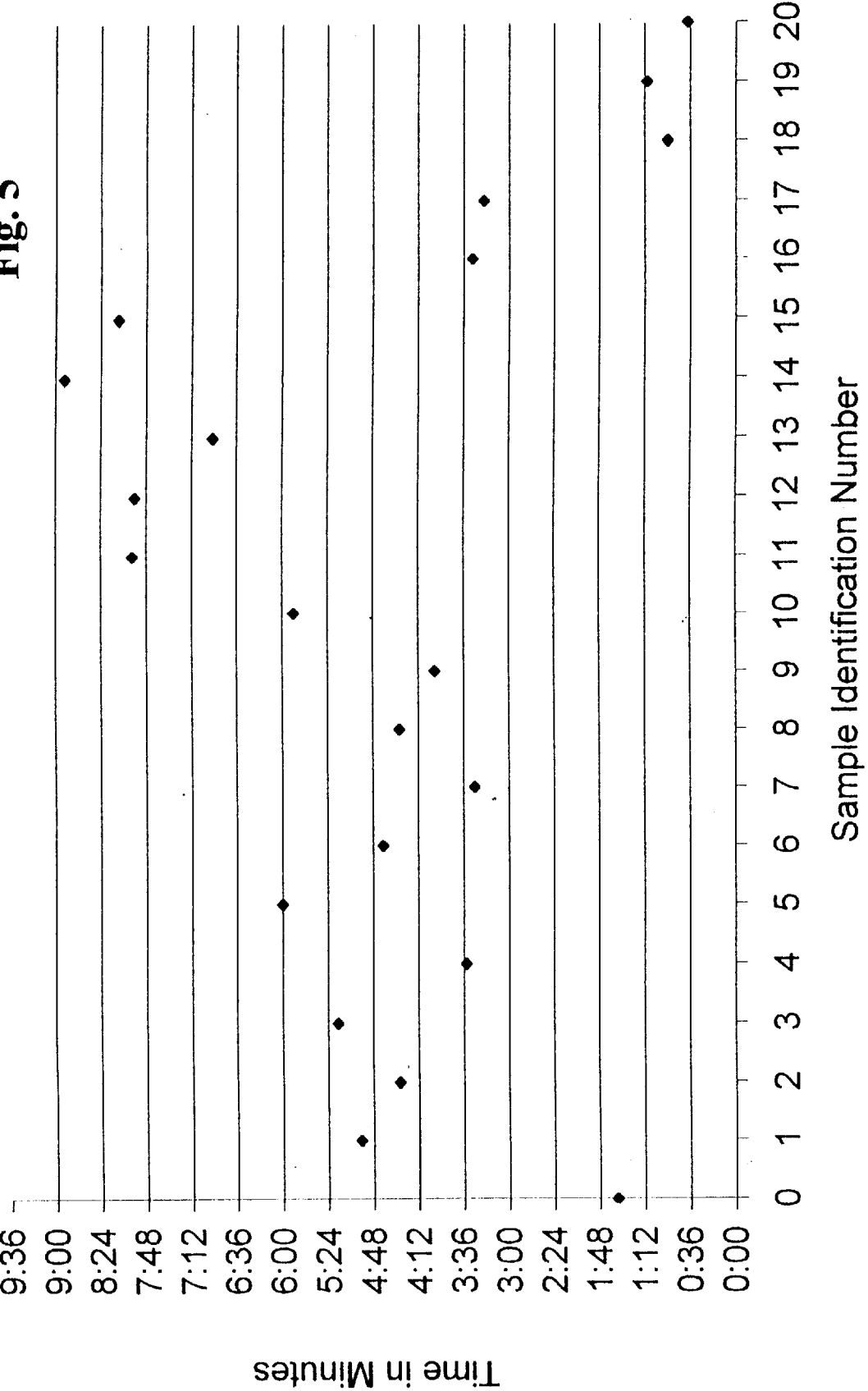

RAPID GEL FORMATION IN HYDROCARBON RECOVERY

TECHNICAL FIELD

This invention relates to hydrocarbon recovery, and in particular to the formation of gels useful in formation fracturing.

BACKGROUND OF THE INVENTION

In the recovery of hydrocarbons from underground formations, it is common to fracture the formations with fluids forced down a wellbore under considerable pressure. Various types of fracturing fluids may be used. This invention is concerned with the use of hydrocarbon fracturing fluids, such as kerosene, Diesel oil, and the like. It is common to viscosify or gel hydrocarbon fracturing fluids so they are better able to handle and distribute the propping agents commonly mixed with them. Propping agents such as sand or other relatively hard particulates are used to maintain the fissures in the formation after they are fractured, to assure the recoverable hydrocarbons in the formation are able to flow through the formation to be recovered.

It is desirable that the additives for the fracturing fluid should act rapidly and efficiently to make a useful—that is, a viscous—gel from a small amount of chemical.

Dialkyl orthophosphates, particularly in the form of their aluminum salts, have been used as components of hydrocarbon gelling agents for many years—see the generic description in Monroe's U.S. Pat. No. 3,575,859, for example, issued in 1971. Monroe uses the dialkyl phosphate esters in combination with alkyl and alkanol amines having up to 4 carbon atoms; he also uses certain polyamines. In U.S. Pat. No. 4,153,649, Griffin lists eighteen U.S. patents said to teach the preparation of phosphate esters useful in formation fracturing, incorporates them by reference, and goes on to discuss several others. More recently, McCabe, in U.S. Pat. No. 5,271,464, employs alkyl orthophosphate esters with aluminum and iron compounds to make a gel; he uses them in combination with a monohydric alcohol having from 2 to 4 carbon atoms and an alkyl or alkanol amine having from 8 to 18 carbon atoms. The gel is used as a temporary plugging agent. McCabe also, in European Patent Application 0 551 021 A1, suggests a similar composition as a fracturing agent.

Smith and Persinski (U.S. Pat. No. 5,417,287) suggest iron compounds in combination with orthophosphate esters to make a viscous hydrocarbon fracturing medium, and, in U.S. Pat. No. 5,614,010, include a low molecular weight amine and, optionally, a surfactant.

SUMMARY OF THE INVENTION

Our invention comprises compositions and methods for gelling hydrocarbon fracturing fluids. The composition comprises a phosphate ester preferably neutralized with potassium hydroxide, dibutylaminoethanol, iron sulfate, and a phosphate surfactant, in the proportions described herein.

The method includes adding the composition to a hydrocarbon fracturing fluid to create a viscous fracturing fluid. The invention further includes a method of fracturing subterranean formation using the gelled hydrocarbon, with or without a proppant, under pressure.

BRIEF DESCRIPTION OF THE DRAWINGS

FIG. 3 plots the close time for gels activated by our activator, using increasing amounts of KOH in the gelling agent.

FIG. 4 shows the crown time for our gels using increasing amounts of KOH.

FIG. 5 shows the Marsh Funnel time for the gels of FIGS. 3 and 4.

DETAILED DESCRIPTION OF THE INVENTION

Figure 1:
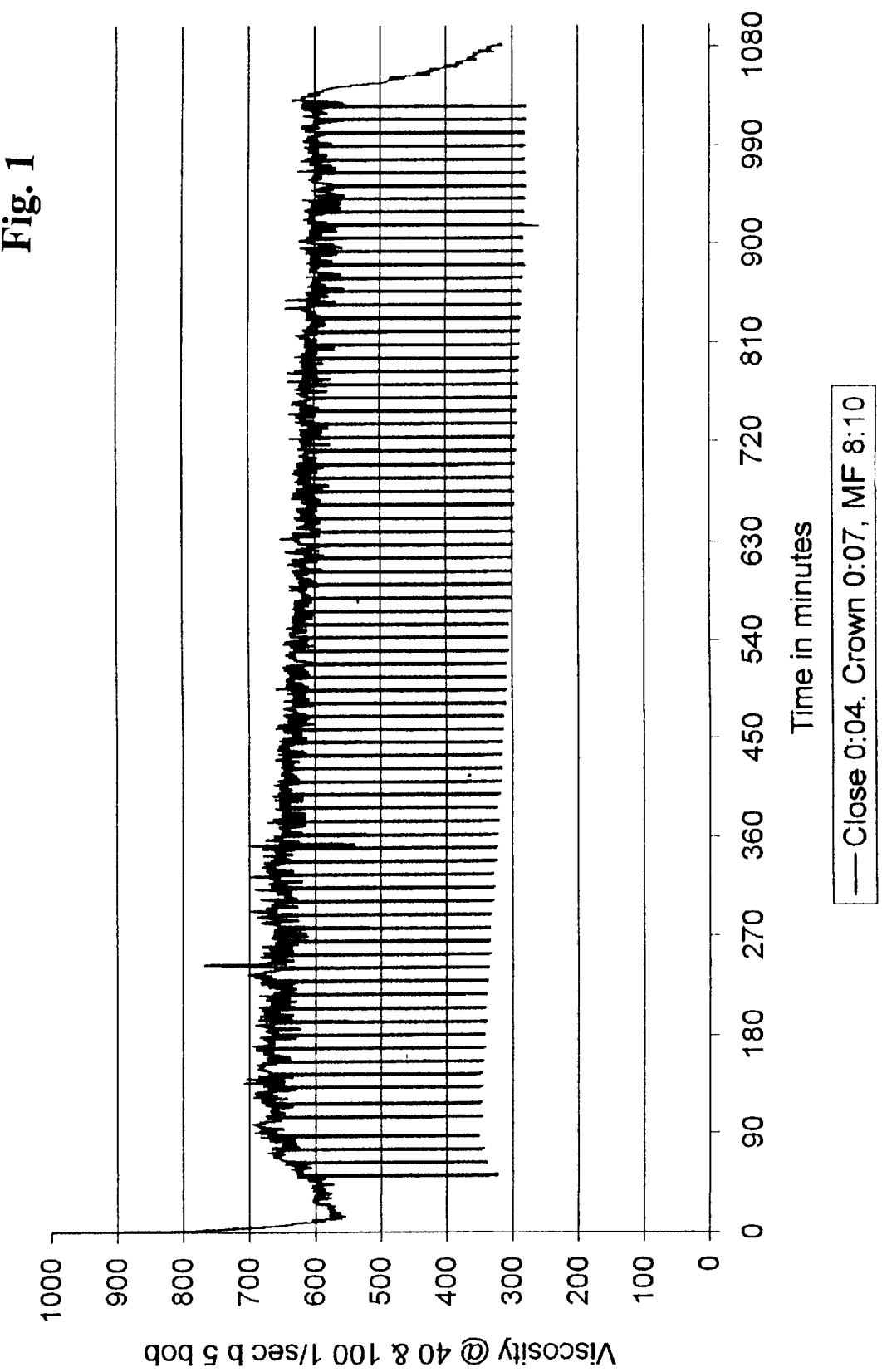
FIG. 1 is a computer printout showing gel stability of our invention at 200° F. under two different revolutions per second of the Fann Viscometer.

Our preferred method of viscosifying a hydrocarbon fracturing fluid is to employ two separate compositions—a phosphate ester which is neutralized by potassium hydroxide, and an activator.

The basic components of our new activator are, in parts by weight:
- 30–48 parts by weight iron sulfate
- 5–25 parts by weight dibutyl amino ethanol, and
- 5–20 parts by weight phosphate surfactant as described below. Dibutyl amino ethanol is sometimes described herein as DBAE.

A preferred activator comprises, by weight, (a) about 50% to about 80% of a 60% solution of iron sulfate, (b) about 5% to about 10% of a solvent selected from isopropanol, ethylene glycol, and butyl cellosolve, (c) about 5% to about 25% dibutyl amino ethanol and (d) about 5% to about 20% of a phosphate surfactant.

The phosphate surfactants we prefer are ethoxylated phosphate esters, and their alkali metal salts, of mono- and disubstituted phenols; the substitutions on the phenolic moieties are hydrocarbon chains of eight to twelve carbon atoms. The amount or ethoxylation may vary considerably, i.e. from one ethoxy unit to ten, fifteen, or more. Some examples, (including their commercial trademarks of Rhone-Poulenc) are:

1. "RM 510"—Polyoxyethylene dinonyl phenyl ether phosphate CAS Registry Name: poly(oxy 1-2 ethanediyl), alpha (dinonylphenyl) omega hydroxy phosphate
2. "RM 410"—Polyoxyethylene dinonlyphenyl ether phosphate CAS Registry Name: poly(oxy 1-2 ethanediyl), alpha-(dinonylphenyl)-omega hydroxy phosphate
3. "RE 410"—polyoxyethylene nonylphenyl ether phosphate CAS Registry Name: poly(oxy 1-2 ethanediyl) alpha-(nonylphenyl)-omega hydroxy, branched, phosphate
4. "RA 600"—complex alkyl phosphate ester CAS Registry Name: poly(oxy 1-2 ethanediyl) alpha omega hydro mono $C_{8-10}$
5. "RE 610"—polyoxyethylene nonlyphenyl, branched phosphate CAS Registry Name: poly(oxy 1-2 ethanediyl) alpha (nonylphenyl) omega hydroxy, branched phosphate.

These phosphate surfactants and similar phosphate surfactants are sometimes referred to herein as "phosphate surfactants".

The efficacy of our composition was demonstrated in a series of experiments. The experiments included close, crown and Marsh funnel tests for several series of ranges and proportions of the components of our system.

The procedure was as follows. In each case, 300 ml of clear, dye-free, additive-free Diesel oil was added to a Waring blender. The blender speed was set at 1500–1800 rpm using a digital tachometer before the Diesel was added to the blender cup. The Diesel oil was added, the blender started, the gellant (80% active phosphate ester with KOH if noted) was added; then the activator (see the definition above) and the stop watch started. Closure is the time for the ball on the bottom of the blender to disappear; crowning is the time after closure for the vortex to disappear. After two minutes of mixing, the sample was transferred to the Marsh funnel and given a 30 seconds rest. Then the sample was permitted to flow through the Marsh funnel and the time the gel takes to reach the 100 ml line on a 300 ml beaker is recorded as Marsh funnel time. A 52 ml sample was then transferred to the Fann viscometer as soon as possible. The Fann viscometer program ran at 40 revolutions per second and 100 revolutions per second with a b5 bob.

For each of the tests, a 60% solution of iron sulfate was used. Several amines with similar molecular weights were mixed with the iron sulfate solution, which was then placed in hydrocarbon fracturing fluid containing 0.5% orthophosphate ester, unless stated otherwise, (and with varying amounts of KOH as noted) and the rapidity of gellation was measured in terms of the results of close, crown and Marsh funnel tests. The phosphoric acid ester used as the gelling agent in each case was the reaction product of phosphoric acid with $C_{8-10}$ alcohols. These and related gelling agents based on phosphoric acid esters are described by Smith and Persinski in U.S. Pat. Nos. 5,417,287, 5,571,315, 5,614,010, and 5,647,900; we may use any of the gelling agents described in these patents, which are incorporated herein by reference.. HGA 715 is 80% phosphate ester, 15% of a 45% active solution of KOH, and 5% solvent.

A series of close, crown, and Marsh funnel tests was run to determine the optimum concentration of DBAE. The results of these tests are shown below in Table I, from which it may be seen that 20% DBAE, based on the ovarall activator composition, was the optimum concentration. A range of 15% to 25% is quite efficient and is a preferred range in our invention. All gels were made at 0.5% gellant and 0.5% activator.

TABLE I

| 5% DBEA | 10% DBEA | 15% DBEA | 20% DBEA | 25% DBEA |
|---|---|---|---|---|
| 60% $Fe_2SO_4$ | 60% $Fe_2SO_4$ | 60% $Fe_2SO_4$ | 60% $Fe_2SO_4$ | 55% $Fe_2SO_4$ |
| 10% RM510 | 10% RM510 | 10% RM510 | 10% RM510 | 10% RM510 |
| 10% Ipa | 10% Ipa | 10% Ipa | 10% Ipa | 10% Ipa |
| 5% water | 10% water | 5% water | | |
| Close:0:19 | Close:0.07 | Close:0.03 | Close 0:03 | Close:0:06 |
| Crown:no | Crown:0:20 | Crown:0:07 | Crown:0:06 | Crown:0:10 |
| Marsh:0:10 | Marsh:0:25 | Marsh:1:21 | Marsh:2:16 | Marsh:8:48 |
| | | MF1hr:0:43 | MF1hr:0:54 | MF1hr:0:59 |

Then, a series of screenings were run to select a surfactant to further enhance the rapidity of gelation Isopropanol is used in combination with the surfactant, in a ratio of 3:2 to 2:3, preferably 1:1.

TABLE II

| Surfactant | Close Time | Crown Time | Marsh Funnel |
|---|---|---|---|
| PL 620 | 1.49 | None | 0:07 |
| R5 095 | None | None | 0:02 |
| RA 600 | 0:04 | 0:06 | 1:05 |
| RB 610 | 0:07 | 0:12 | 2:28 |
| RE 510 | 0:04 | 0:06 | 0:06 |
| RE 410 | 0:04 | 0:06 | 0:58 |
| RM 510 | 0:04 | 0:06 | 1:54 |

Figure 2:
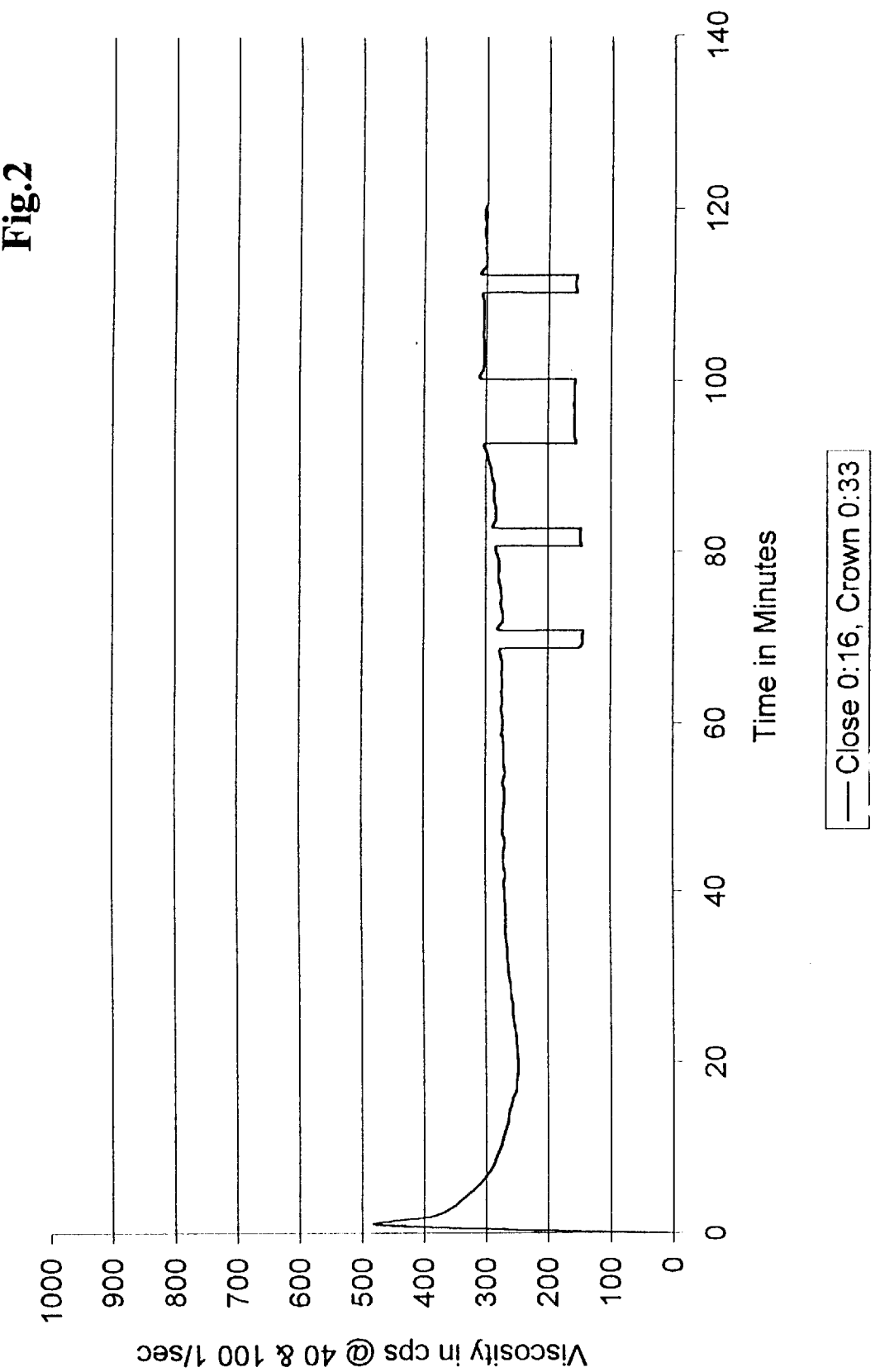
FIG. 2 is similar to FIG. 1 but shows gel stability of a lower concentration of our activator.

The temperature stability of our gels is shown in FIGS. 1 and 2. FIG. 1 shows the results in the Fann Viscometer or 0.5% phosphate ester (neutralized with 15% KOH solution as stated above) and 0.5% activator. The upper edge of the band represents the result at 40 rpm and the lower edge of the band represents the result at 100 rpm. In FIG. 2, 0.3% gelling agent and 0.3% activator were used; again, the higher values are at 40 rpm and the lower ones are at 100 rpm.

An activator formulation comprising 60% iron sulfate (60% conc.), 20% DBAE, and 10% phosphate surfactant (RM 510) was now tested against phosphate ester compositions having twenty different incremental amounts of KOH neutralizer. These results are shown graphically in FIGS. 3, 4, and 5. An optimum neutralization of the phosphate ester is in the range of about 8–18% KOH, taking all three criteria—close time, crown time, and Marsh funnel time—into account, although any amount from 0–20% will have beneficial effects.

What is claimed is:

1. An activator composition for gelling hydrocarbons with phosphate esters, comprising (a) 50% to 80% of a 60% solution of iron sulfate, (b) 5% to 10% isopropanol, (c) 5% to 25% 2-dibutylaminoethanol, and (d) 5% to 20% of a phosphate surfactant.

2. Composition of claim 1 wherein said phosphate surfactant is a phosphate ester of ethoxylated dodecylalcohol.

3. Composition of claim 1 wherein said phosphate surfactant is a polyoxyethylene dinonylphenyl ether phosphate.

4. Composition of claim 1 wherein said 2-dibutylaminoethanol is present in an amount from 15% to 25%.

5. Composition for activating phosphate ester gellants for hydrocarbons comprising 30–48 parts by weight iron sulfate, 5–25 parts by weight dibutylaminoethanol, and 5–20 parts by weight phosphate surfactant.

6. Composition of claim 5 including a solvent selected from the group consisting of isopropanol, ethylene glycol, and butyl cellosolve.

7. Composition of claim 5 wherein the phosphate surfactant is an ethoxylated phosphate ester, or salt thereof, of a mono- or disubstituted phenol wherein the substitutions on the phenolic moieties are hydrocarbon chains of eight to twelve carbon atoms.

8. Composition of claim 5 including isopropanol in a weight ratio to said phosphate surfactant of about 3:2 to 2:3.

* * * * *